US005996204A

United States Patent [19]

Norwood

[11] Patent Number: 5,996,204

[45] Date of Patent: Dec. 7, 1999

[54] METHOD FOR HANGING SIGN

[76] Inventor: John V. Norwood, 6320 Park Ridge Rd., Loves Park, Ill. 61111

[21] Appl. No.: 09/092,661

[22] Filed: Jun. 5, 1998

Related U.S. Application Data

[62] Division of application No. 08/872,487, Jun. 7, 1997, Pat. No. 5,848,488.

[51] Int. Cl.[6] .......... B23P 11/02

[52] U.S. Cl. .......... 29/450; 256/10; 24/129 B; 29/505; 40/617

[58] Field of Search .......... 40/617, 611, 642, 40/661, 309, 310, 673, 316, 305, 664, 308, 317, 334, 666; 24/129 B, 129 R, 129 D; 256/10, 4; 29/505, 8 B, 450

[56] References Cited

U.S. PATENT DOCUMENTS

| | | | |
|---|---|---|---|
| 278,097 | 5/1883 | Collins | 24/129 B |
| 407,636 | 7/1889 | Browne . | |
| 590,591 | 9/1897 | Purdy | 24/129 B |
| 956,168 | 5/1910 | Petersen | 24/129 B |
| 1,056,701 | 3/1913 | Lowndes, Jr. | 40/305 |
| 1,241,302 | 9/1917 | Taylor . | |
| 1,345,782 | 7/1920 | Keller | 40/673 |
| 1,563,371 | 1/1925 | Jones | 40/316 |
| 1,806,162 | 5/1931 | Hahn | 24/712.6 |
| 2,282,872 | 5/1942 | Mayer et al. | 40/159 |
| 2,723,816 | 11/1955 | Drysdale | 248/29 |
| 2,756,525 | 7/1956 | Geenberger | 40/315 |
| 2,886,907 | 5/1959 | Stephenson | 40/10 |
| 2,888,761 | 6/1959 | Miller | 40/10 |
| 3,464,135 | 9/1969 | Eidinger | 40/159 |
| 3,964,197 | 6/1976 | Tucker et al. | 40/125 E |
| 4,089,129 | 5/1978 | Patterson, Jr. | 40/606 |
| 4,240,543 | 12/1980 | McKee | 206/39 |
| 4,422,852 | 12/1983 | Mathias | 434/178 |
| 4,685,785 | 8/1987 | Mundt et al. | 353/120 |
| 4,760,660 | 8/1988 | Fast | 40/308 |
| 4,761,904 | 8/1988 | Fast et al. | 40/308 |
| 4,862,617 | 9/1989 | Cooke, Jr. et al. | 40/663 |
| 4,899,474 | 2/1990 | Piana et al. | 40/316 |
| 4,941,434 | 7/1990 | Ellwanger | 119/109 |
| 5,092,066 | 3/1992 | Brewster | 40/617 |
| 5,553,411 | 9/1996 | Kolton et al. | 40/640 |
| 5,848,488 | 12/1998 | Norwood | 40/617 |

FOREIGN PATENT DOCUMENTS

| | | | |
|---|---|---|---|
| 2167223 | 5/1986 | United Kingdom | 40/316 |

*Primary Examiner*—S. Thomas Hughes
*Assistant Examiner*—Steven Blount
*Attorney, Agent, or Firm*—Leydig, Voit & Mayer Ltd

[57] ABSTRACT

A method for quickly and easily attaching and removing a sign from a rope. The sign has a split-T portion defining flexible arms. The arms are bent to allow the rope to slide through transition slots to ultimately enter rope engaging channels. The arms are then released so that the transition slots have a width which restricts passage of the rope, thereby confining the rope to the rope engaging channels. The deflecting portions of the arms are located near the center of the sign to correspond with the natural position of a person's thumbs when holding the sign. The sign allows a new method for attaching a sign to a rope to be used, in which both arms are simultaneously bent from the center of the sign to insert the rope in the rope engaging channels.

6 Claims, 1 Drawing Sheet

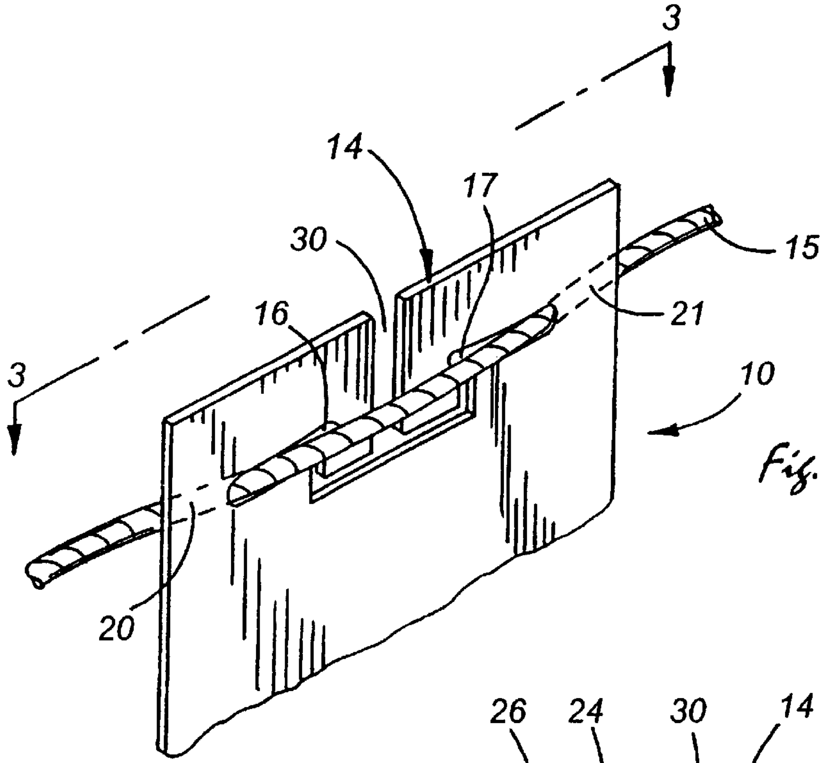
Fig. 1
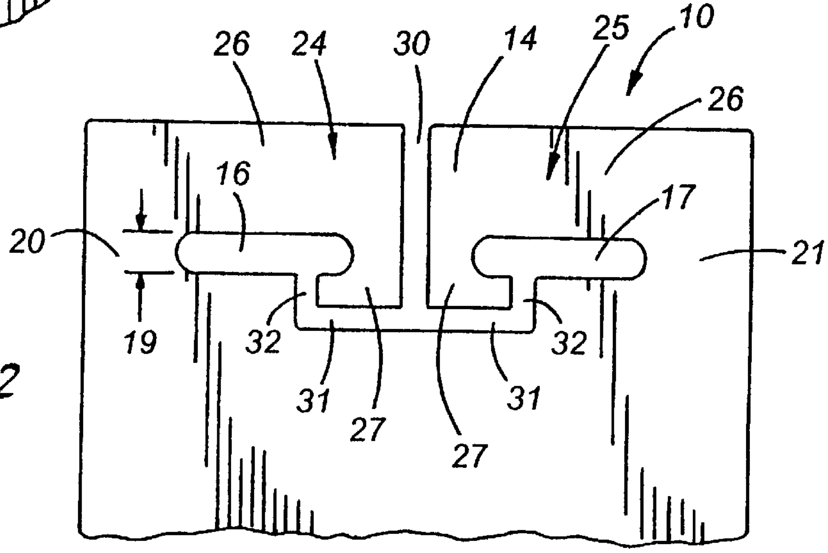
Fig. 2
Fig. 3
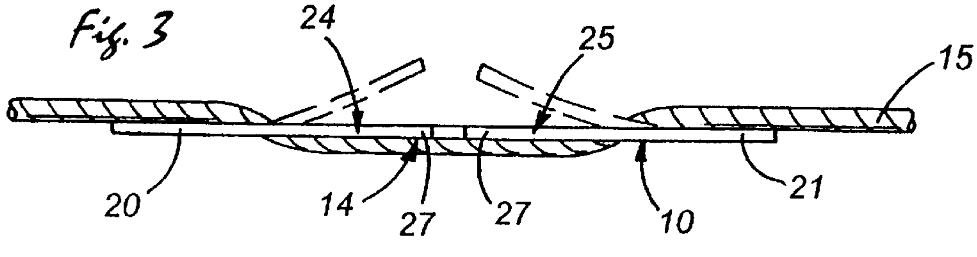

METHOD FOR HANGING SIGN

CROSS-REFERENCE TO RELATED APPLICATION

This is a divisional application of U.S. patent application Ser. No. 08/872,487, filed Apr. 7, 1997 now U.S. Pat. No. 5,848,488.

FIELD OF THE INVENTION

The present invention generally relates to a method for hanging a sign on a rope, fence, or other similar support.

BACKGROUND OF THE INVENTION

It is often desirable to restrict access to dangerous, hazardous, or restricted areas by sectioning such areas off. Ropes, chains, fencing, and other similar barriers are typically placed around the perimeter of the area to restrict entrance. It is further desirable to attach signs to the rope or support which carry information regarding the nature of the hazard or identify the particular danger or restriction with greater specificity.

It is important for the signs to hang from the rope or support in such a manner that they can easily be seen and read when approaching the area. In addition, when attached to the barrier, the sign must be capable of withstanding wind and other forces which may inadvertently dislodge the sign from the barrier.

A sign which may be attached to and removed from the rope without disturbing the ends of the rope is disclosed in Brewster, U.S. Pat. No. 5,092,066. Brewster describes a sign having two openings for receiving a rope. The Brewster device has wings which may be temporarily deflected to allow the passage of the rope into the openings and released to capture the rope within the openings. When so captured, the rope is threaded around three fixed supports—a stationary center support located between the openings and two stationary side supports located near the periphery of the sign, one outside of each opening. The supports are fixed in the sense that they remain coplanar with the sign and do not deflect for inserting or removing a rope, as do the wings. More particularly stated, the rope in the Brewster device follows a path in which the rope engages a first side support, passes through a first opening and engages the center support, and then passes through the second opening to engage a second side support. The three stationary supports therefore engage and secure the sign to the rope.

Brewster further specifies two narrow slits leading to the openings which drop vertically from the top edge near the sides of the sign and then run horizontally to meet the ends of the openings. The device thereby creates wings which deflect near the sides of the sign to allow insertion of the rope into the openings. The Brewster device, however, is cumbersome to install on a rope. Typically, the rope is inserted in one slot, the installer's hands are repositioned, and then the rope is inserted in the other slot. Installation of the sign on a rope therefore requires the sign to be manipulated in a number of different ways and the installer must possess a certain degree of manual dexterity.

The Brewster device also presents four areas having increased potential for failure. The machined openings and slits of the Brewster device create four areas on the sign which have a relatively narrow cross-section. These areas are located at the two side supports and the two wings. These areas are easily flexed and may break under large forces.

SUMMARY OF THE INVENTION

A general aim of the present invention is to provide a new and improved hanging sign having a new structure and functionality much more attuned to one step, direct installation.

In that regard, it is one object of the present invention to provide a middle support which moves between a normal position in which the middle support engages the rope to secure the sign and a flexed position which allows passage of the rope.

More particularly, it is an object of the present invention to provide a sign having arms which deflect from the center of the sign to control the passage of the rope.

It is also an object of the present invention to provide a sign which minimizes the number of areas of potential failure.

It is a feature of the invention to provide a sign having a split-T middle portion disposed between rope engaging channels. The split-T portion not only engages the rope in the normal position to secure the sign to the rope, but also deflects to provide access to and from the rope engaging channels. The split-T portion deflects near the center of the sign to more conveniently correspond with the natural position of a person's thumbs when holding the sign.

It is also a feature of the present invention to provide arms for controlling the width of transition slots leading to the rope engaging channels, the width varying between a normal position, in which the width is smaller than the diameter of the rope, and an open position, in which the slot allows passage of the rope.

It is further a feature of the present invention to provide only two flexible portions on the sign. The reduction of flexible portions reduces the number of potential areas at which the sign may break.

These and other objects and advantages of the invention will become more apparent from the following detailed description when taken in conjunction with the accompanying drawings.

BRIEF DESCRIPTION OF THE DRAWINGS

FIG. 1 is a perspective view showing the rope engaging portion a sign in accordance with the present invention attached to a rope.

FIG. 2 is a front view of the sign of FIG. 1.

FIG. 3 is a top view of the sign taken along line 3—3 of FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration, the invention is shown in FIG. 1 as embodied in a sign 10 having a generally rectangular body. The lower portion of the sign 10 may receive a legend containing a warning or other information regarding a restricted area. The upper portion of the sign 10 incorporates a split-T portion 14 advantageously located near the middle of the sign for easily attaching the sign to a rope 15.

As best shown in FIG. 2, rope engaging channels 16, 17 are provided for securing the sign 10 to the rope 15. The rope engaging channels 16, 17 are preferably shaped to correspond with the natural path of the rope so that the sign 10 hangs straight when attached to the rope 15. As illustrated in FIG. 1, the rope will typically follow a generally horizontal path and, therefore, the rope engaging channels 16, 17 preferably extend substantially horizontally. The rope engaging channels 16, 17 have a width 19 sized to accommodate the diameter of the rope 15.

Side supports 20, 21 are provided to engage the rope when the sign is attached to a rope. As best illustrated in FIGS. 1 and 2, the side supports 20, 21 are horizontally aligned with the rope engaging channels 16, 17 and disposed near the periphery of the sign 10. With reference to FIG. 3, it will be appreciated that the rope 15 engages the side supports 20, 21 when a rope is inserted in the rope engaging channels 16, 17.

The split-T portion 14 is centrally located near a top edge of the sign 10 for adapting the sign to engage the rope 15 and secure the sign to the rope. The split-T portion 14 has first and second deflecting arms 24, 25, each arm comprising a horizontal bending portion 26 disposed above the rope engaging channel and a vertically disposed deflectable portion 27 depending from the horizontal portion 26 between the rope engaging channels 16, 17. As best shown in FIGS. 1 and 3, when the split-T portion 14 is in a normal, unflexed position, the rope 15 supporting the sign 10 follows a serpentine path in which the rope travels along a first face of the sign to engage the first side support 20, passes through the first rope engaging channel 16 to reach a second face of the sign and engage the vertical portions 27 of the arms 24, 25, and then passes through the second rope engaging channel 17 back to the first face to engage the second side support 21. It will therefore be appreciated that the vertical portions 27 provide a center support for securing the sign to the rope.

The split-T portion 14 also deflects to a flexed position for allowing passage of the rope 15 to and from the rope engaging channels 16, 17. As best shown in FIG. 2, the arms 24, 25 are defined by a central slit 30, entrance channels 31, transition slots 32, and rope engaging channels 16, 17. The central slit 30 is disposed substantially along the vertical center line of the sign 10 and divides the two arms 24, 25. The entrance channels 31 preferably extend horizontally outwardly from the central slit 30. While the present invention may function with entrance channels 31 angled to a certain degree, it has been found that horizontal channels allow for easier assembly because they more closely follow the path of the rope 11. The transition slots 32 connect the entrance channels 31 to the rope engaging channels 16, 17. In the preferred embodiment, the transition slots 32 extend substantially vertically between the entrance channels 31 and the rope engaging channels 16, 17. While transition slots 32 at other angles may be used, it has been found that vertical transition slots allow for the easiest attachment and removal since the sign is raised or lowered during these operations.

It will be noted that when the arms 24, 25 are in the normal position, the width of the transition slots 32 is smaller than the diameter of the rope 15 to thereby restrict passage of the rope. In the flexed position, the width of the transition slots 32 is increased to allow passage of the rope 15 to and from the rope engaging channels 16, 17. Turning to the widths of the central slit 30 and entrance channels 31, there are no limits on the size of the widths other than those relating to the structural integrity of the sign. Accordingly, it is preferable to minimize the widths of the central slit 30 and entrance channels 31 to maximize the strength of the sign 10. In the illustrated embodiment, the transition slots 32, central slit 30, and entrance channels 31 all have substantially the same width.

In operation, it will be appreciated that the central slit 30, entrance channels 31, and transition slots 32 define flexible arms 24, 25 for facilitating the insertion and removal of rope 15 in the rope engaging channels 16, 17. When the arms 24, 25 are flexed, the width of the transition slots 32 increases to accommodate the diameter of the rope 15. As a result, the rope may slide through the transition slots into the rope engaging channels 16, 17. Upon release, the arms resiliently return to the normal position in planar relationship to the remainder of the sign 10, thereby returning the transition slots 32 to their original width to confine the rope to the rope engaging channels 16, 17. It will therefore be appreciated that wind and other forces exerted on the sign cannot inadvertently dislodge the sign 10 from the rope 15.

From the above, it will further be appreciated that, unlike prior art devices, the present invention has a deflectable, rather than stationary, center support for securing the sign 10 to the rope 15. The deflectable center support requires only one manual manipulation to open both transition slots 32, thereby facilitating one step installation of the rope 15 into the rope engaging channels 16, 17.

The central location of the flexible arms 24, 25 facilitates the simultaneous bending of both arms to allow quicker and easier installation and removal of the sign 10. It will be appreciated that when a person holds a sign, the person's thumbs are disposed near the center of the sign. Since the flexible portions of the arms 24, 25 correspond to the natural position of the thumbs, it is easy for a person to exert pressure on the arms with the thumbs while gripping the edges of the sign with the fingers, thereby providing adequate leverage to deflect the arms. It will further be appreciated that both arms 24, 25 are easily deflected at the same time in this manner.

The present invention also provides a novel method for inserting a sign on a rope. According to this method, the sign 10 is held in front of and against the rope 15 with the rope in approximately the same position as the horizontal entrance channels 31. Both arms 24, 25 are then bent simultaneously toward and past the rope 15 so that transition slots 32 are wide enough to accept the diameter of the rope 15. The sign is then lowered to slide the rope 15 through the transition slots 32 and into the rope engaging channels 16, 17. Finally, the arms 24, 25 are released so that the transition slots 32 again have a width which restricts passage of the rope 15. The rope is therefore secured in the rope engaging channels 16, 17 and resists inadvertent removal from forces such as wind. In this manner, the arms are simultaneously bent to allow quicker and easier insertion and removal of the sign.

From the above, it will be appreciated that the present invention presents a sign 10 which has only two flexible portions, thereby minimizing the number of potentially breakable areas on the sign. As described herein, the arms 24, 25 are the only portions of the sign 10 capable of bending. Accordingly, only the arms are subject to increased risk of failure. This is in contrast with previous devices which have more areas which may easily be bent and therefore increased chances of failure.

The sign is formed from material suitable for meeting several criteria. First, the material must have significant weight so that the sign hangs properly from the rope, even during windy conditions. In addition, the material must be flexible so that the arms 24, 25 can be manipulated between normal and flexed positions. The flexible material must, however, be sufficiently rigid to provide a stable center support for engaging the rope in the normal position.

LEXAN brand polycarbonate, manufactured by General Electric, is a preferable material which displays the above-mentioned characteristics. Other suitable materials known to those skilled in the art may also be used.

From the foregoing, it will be apparent that the present invention brings to the art a new and improved hanging sign which can be quickly and easily inserted onto a rope. The sign incorporates a series of slits and channels to form a split-T portion centered near the top of the sign. The split-T portion defines flexible arms which deflect from the center of the sign and which correspond to the natural positioning of a persons thumbs when holding the sign. The arms may be simultaneously bent to facilitate access to a pair of rope engaging channels. Once the rope has been inserted in the rope engaging channels, the arms are released to restrict the rope to those channels. The present invention therefore provides a sign having a deflectable center support which is more quickly and easily inserted on and removed from a rope.

What is claimed is:

1. A method for hanging a sign on a rope, the method comprising the steps of:

(1) aligning horizontal entrance channels on the sign with the rope;

(2) simultaneously bending arms on the sign toward and past the rope;

(3) lowering the sign so that the rope slides through transition slots on the sign to enter rope engaging channels;

(4) releasing the arms to close the transition slots and return the arm to a planar relationship with the rest of the sign, the rope thereby passing through both rope engaging channels to secure the sign to the rope.

2. The method of claim 1 in which the arms deflect from a central portion of the sign.

3. The method of claim 1 in which the horizontal entrance channels are substantially horizontal.

4. The method of claim 3 in which the rope engaging channels are substantially horizontal.

5. The method of claim 4 in which the transition slots are substantially vertical and connect the entrance channels to the rope engaging channels.

6. The method of claim 5 in which the transition slots have a width adjustable between a normal position, in which passage of the rope through the transition slots is restricted, and a flexed position, in which the rope may pass through the transition slots.

* * * * *